United States Patent
Lalane

[11] Patent Number: 6,161,331
[45] Date of Patent: Dec. 19, 2000

[54] BULB CASING FOR PROPER POSITIONING, FEEDING AND PROTECTION OF PLANT BULBS

[76] Inventor: Renee Lalane, 71 Old Neck Rd., Center Moriches, N.Y. 11934

[21] Appl. No.: 09/302,946

[22] Filed: Apr. 30, 1999

[51] Int. Cl.[7] .............................. A01G 13/00; B65D 85/52
[52] U.S. Cl. ................................................. 47/73; 206/423
[58] Field of Search ................................. 47/73, 74, 75, 47/76, 77; 206/423; 229/114; 493/902

[56] References Cited

U.S. PATENT DOCUMENTS

| | | | |
|---|---|---|---|
| 1,493,152 | 5/1924 | Gardner | 206/423 X |
| 2,293,531 | 8/1942 | Brooks | 47/73 |
| 2,578,271 | 12/1951 | Teufel | 206/423 |
| 2,664,670 | 1/1954 | Mulford | 47/72 X |
| 3,469,341 | 2/1970 | Bourget et al. | 206/423 X |
| 3,515,036 | 6/1970 | Oki et al. | 47/77 X |
| 3,550,318 | 12/1970 | Remke et al. | 206/423 |
| 3,678,620 | 7/1972 | Voges | 47/73 |
| 3,919,163 | 11/1975 | Clendinning et al. | 260/40 R |
| 4,189,868 | 2/1980 | Tymchuck et al. | 47/77 X |
| 4,209,092 | 6/1980 | Jones | 206/423 |
| 4,280,648 | 7/1981 | Boursier | 229/2.5 EC |
| 4,556,147 | 12/1985 | Magnussen, Jr. | 206/493 |
| 4,637,811 | 1/1987 | Fortney | 493/902 X |
| 4,777,763 | 10/1988 | Shannon et al. | 47/74 |
| 4,930,681 | 6/1990 | Fultz et al. | 229/114 |
| 4,997,091 | 3/1991 | McCrea | 206/584 |
| 5,060,420 | 10/1991 | Bergman | 47/78 |
| 5,090,156 | 2/1992 | Kawarabayashi | 47/58 |
| 5,213,858 | 5/1993 | Tanner et al. | 428/34.2 |
| 5,287,651 | 2/1994 | deGraaf | 47/66 |
| 5,362,776 | 11/1994 | Barenberg et al. | 524/35 |
| 5,379,550 | 1/1995 | Beljaars | 47/87 |
| 5,522,178 | 6/1996 | Cone | 47/58 |
| 5,577,989 | 11/1996 | Neary | 439/902 X |
| 5,623,815 | 4/1997 | Hornstein et al. | 53/472 |
| 5,651,214 | 7/1997 | Zucker et al. | 47/74 |
| 5,669,552 | 9/1997 | Watanabe | 229/114 |
| 5,674,546 | 10/1997 | Barnes | 426/120 |
| 5,718,368 | 2/1998 | Rench et al. | 229/114 X |
| 6,050,027 | 4/2000 | Pavelka et al. | 47/84 |

FOREIGN PATENT DOCUMENTS

| | | | |
|---|---|---|---|
| 2 592 007 | 6/1987 | France | 47/73 |

*Primary Examiner*—Michael J. Carone
*Assistant Examiner*—Jeffrey L. Gellner
*Attorney, Agent, or Firm*—Alfred M. Walker

[57] ABSTRACT

A bulb casing encases a plant bulb and properly positions, feeds and protects the plant bulb, in a biodegradable casing including two joinable, substantially hemispheric cavity members, preferably having plant nutritional supplements on or in an inside surface adjacent to the bulb's outer surface and rodent repellent materials on or in the outside surface thereof. The plant nutritional supplements can be plant food, such as bone meal. Artificial rodent repellents such as mothball materials or biodegradable, non-toxic chemicals such as cayenne pepper can be used. Preferably, the hemispheric cavity members are formed out of biodegradable cardboard or cellulosic material, such as moldable paper pulp or starch resins, so that the casings will degrade in the ground as the bulb grows to a plant. The two hemispheric cavity members are provided preferably each on a flat piece of material, which is scored at its mid point to form a hinge, so that the two hemispheric cavity members converge to form a substantially spherical casing around the plant bulb. A loose latch joint closes the bulb casing around the plant bulb. On the bottom of the bulb casing are provided extendible leg portions, so that the bulb casing can be self-standing within the hole in the ground in which the plant bulb is to be planted.

29 Claims, 4 Drawing Sheets

BULB CASING FOR PROPER POSITIONING, FEEDING AND PROTECTION OF PLANT BULBS

FIELD OF THE INVENTION

The present invention relates to bulb casings for proper positioning, feeding and protection of plant bulbs within a planting hole.

BACKGROUND OF THE INVENTION

When plant bulbs are planted within the ground, there is a tedious process involved. First, holes must be dug for each bulb. Then plant food and/or rodent repellent materials must be mixed with planting soil, and then the individual bulbs must be meticulously placed in the ground facing vertically upright, so that they grow up and out of the ground from within the dirt placed around and on top of the bulb.

It is very difficult to properly orient the bulb in the vertical upright position while re-filling the hole with dirt on top of the bulb until it is completely covered.

Among relevant prior art includes U.S. Pat. Nos. 5,060,420 of Bergman for a burlap bulb package with a string, 5,287,651 of deGraaf for a felt blanket for multiple bulbs, 5,522,178 of Cone for a seasonally removable bulb package, 3,678,620 of Voges for a package for multiple bulbs and 3,919,163 of Clendenning for a biodegradable plant container.

However, these prior art patents do not provide for a biodegradable, self-standing bulb casing for plant bulbs which orients the bulb in the proper upright position for growth with nutrients and rodent protection, while the user deposits planting soil over the bulb during planting.

For example, while Bergman '420 enables one to hold a string to position the bulb within the burlap package in an upright position, the user has to awkwardly hold the string while depositing soil from a shovel with the other hand. If one lets go of the string, the bulb can topple over to an improper non-upright position.

Commercial holders for multiple bulbs in a growing position within an artificial matrix are shown in deGraaf '651 and Voges '620, but these matrixes do not enable a user to plant bulbs singly in a proper upright position. Cone '178 is a bulky, artificial, non-biodegradable housing for a bulb, which is seasonally removed after each growing season. Furthermore, while Clendenning '163 describes biodegradable plant containers, it does not describe a self-standing bulb casing, which is also self-standing for properly orienting the bulb in a proper growing position with nutrients and rodent protection.

OBJECTS OF THE INVENTION

It is therefore an object of the present invention to provide a bulb casing for proper positioning, feeding and protection of individual plant bulbs.

It is a further object to provide a self-standing bulb casing which stands a bulb in an upright vertical growing position.

It is yet another object to provide a bulb casing that provides nutritional plant supplements to the bulb.

It is yet another object to provide a bulb casing, which repels rodents in a non-toxic, passive, manner.

It is yet another object to provide a bulb casing that is inexpensive to manufacture and takes up little store shelf space due to the ability to nest sheets of bulb casings.

SUMMARY OF THE INVENTION

In keeping with these objects and others which may become apparent, the present invention is a bulb casing for proper positioning, feeding and protection of plant bulbs, wherein a plant bulb is encased in a biodegradable casing including two joinable, substantially hemispheric members having plant nutritional supplements on a substantially concave inside surface adjacent to the bulb's outer surface and rodent repellent materials on the substantially concave outside surface thereof.

Alternatively, the plant nutritional supplements and rodent repellent materials can be impregnated within the bodies of the hemispheric members.

The plant nutritional supplements can be plant food, such as for example, bone meal.

Furthermore, while artificial rodent repellents such as mothball materials may be used, biodegradable, non-toxic chemicals such as cayenne pepper can also be used.

Preferably, the hemispheric members are formed out of biodegradable cardboard or cellulosic material, such as moldable starches, so that the casings will degrade in the ground as the bulb grows to a plant.

The two half pieces with hemispheric members therein are each preferably provided on a flat piece of material, which is scored at its mid point to form a hinge, so that the two half pieces with hemispheric members therein can converge to form a spherical casing around the bulb. A loose joint with a tab and recess is formed to close the casing around the bulb. On the bottom of the flat pieces are provided extendible leg portions, so that the casing can be self-standing within the hole in which the bulb is to be planted.

The present invention has the ability to orient the bulb in a proper position within the planting hole, with protection against rodents and with plant food.

BRIEF DESCRIPTION OF THE DRAWINGS

The present invention can best be understood in connection with the accompanying drawings, in which.

DETAILED DESCRIPTION OF THE INVENTION

The bulb casings of this invention are made of a biodegradable material such as molded paper pulp or starch based plastic resins.

Figure 1:
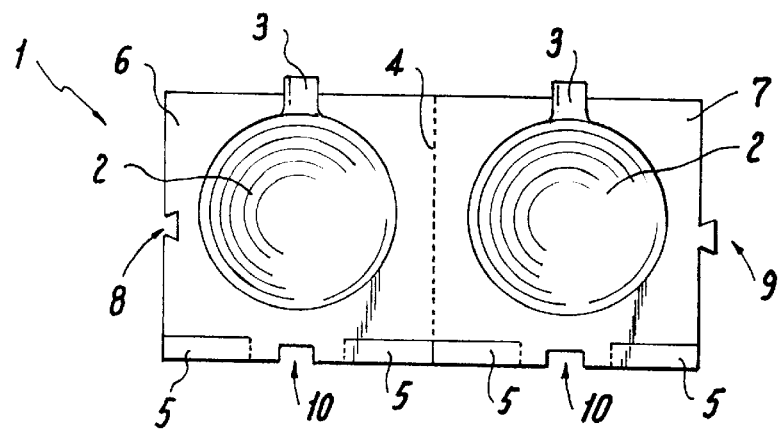
FIG. 1 is a front elevational view of an interior of the bulb casing of this invention in an open configuration.

FIG. 1 shows a single bulb casing 1 in the open position with left flat half piece 6 and flat right half piece 7 hinged at folding scored line 4. Hemispheric cavities 2 are provided within each flat half piece 6 and 7. These half pieces 6 and 7 communicate with open necks 3. Each hemispheric cavity 2 has an inner concave surface and a convex outer surface.

While any type of closure may be used, preferably latch tab 9 and latch notch recess 8 are used to keep the two flat half pieces 6 and 7 together after they are folded shut.

Figure 2:
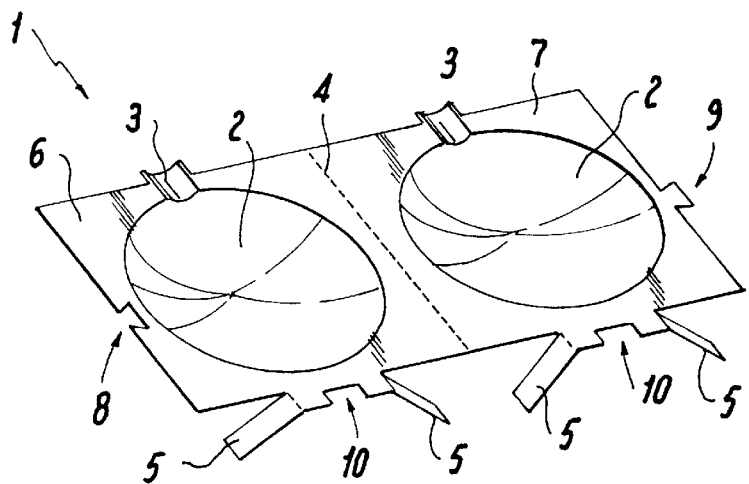
FIG. 2 is an isometric interior view of the embodiment for a bulb casing for a single plant bulb as in FIG. 1.

FIG. 2 shows the interior features more clearly in the isometric view. In particular, stand members 5, such as, for example, bent legs to keep bulb casing 1 in a proper upright position within a planting hole in the ground, are shown properly bent prior to assembly in a closed position. Notches 10 are an artifact of the manufacturing process and have no particular function.

Figure 3:
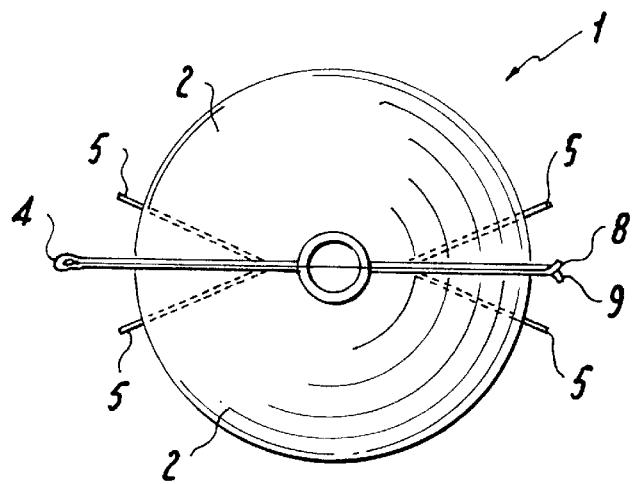
FIG. 3 is a top plan view of the bulb casing as in FIGS. 1 and 2, shown in a closed, empty position.

FIG. 3 shows a top plan view of bulb casing 1 folded and latched with stand members 5 ready to engage the soil at the bottom of a planting hole in the ground, to maintain bulb casing 1 in an upright position. In FIG. 3, bulb casing 1 is shown empty for illustrative purposes only.

Figure 4:
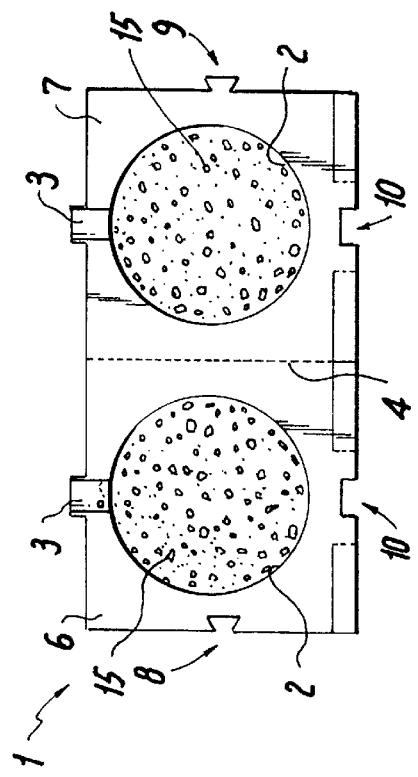
FIG. 4 is a front elevational view of the interior of the bulb casing thereof, showing plant food therein.

FIG. 4 is another inside open view of bulb casing 1 now showing a pattern of bulb or plant food 15 that has been adhered to the inside surfaces of the respective hemispheric cavities 2 of flat half pieces 6 and 7. This is (lone by a spraying or brushing process.

Alternatively, or in addition to this interior plant food, plant nutrients can be added to and impregnated within the biodegradable material of bulb casing 1 during manufacture.

Figure 5:
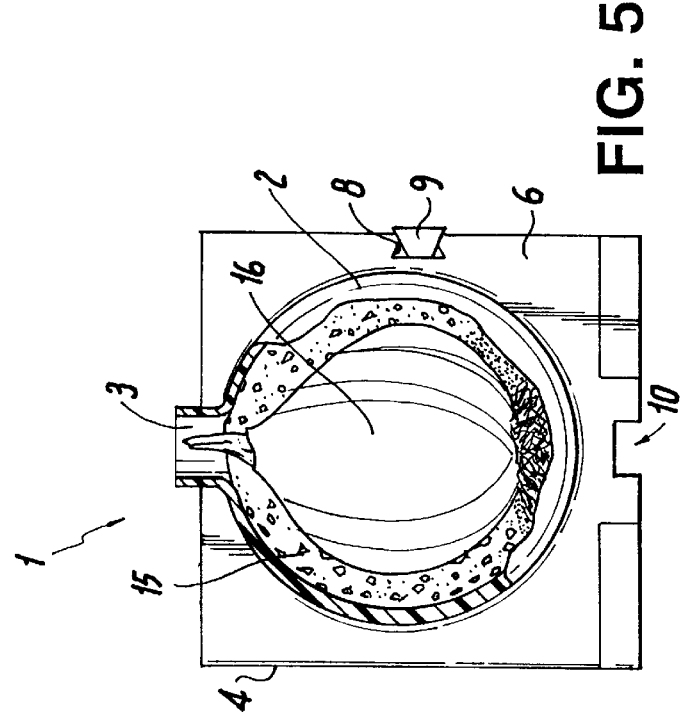
FIG. 5 is a front cross sectional view thereof, showing a plant bulb within the bulb casing.

FIG. 5 shows a front view of a closed bulb casing 1 with the foreground hemisphere removed (as shown in the cross section at the front plane of half piece 6 to reveal the position of a plant bulb 16 within. FIG. 5 also shows the preferable interlocking of latch member 9 and notch 8 in this view.

Figure 6:
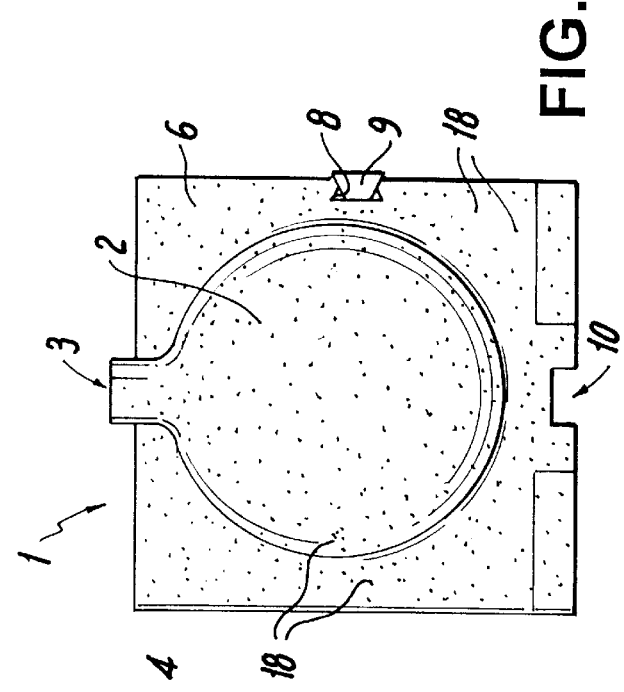
FIG. 6 is a front exterior view of the bulb casing in a closed position, showing rodent repellent thereof.

FIG. 6 shows a front view of bulb casing 1 with a surface coating 18 of a non-toxic rodent repellent such as cayenne pepper. This can be mixed with an appropriate binder and sprayed on as a suspension. Other rodent repellent materials such as moth ball materials, such as camphor or naphthalene may be used. Alternatively, in an alternate embodiment, the rodent repellent can be mixed in with the biodegradable material of casing 1 during manufacture. As also shown in FIG. 6, latch tab 9 of half piece 7 is inserted into latch recess 8 of half piece 6 to form a loose joint closing half pieces 6 and 7 together around bulb 16, as shown in FIG. 5.

Figure 7:
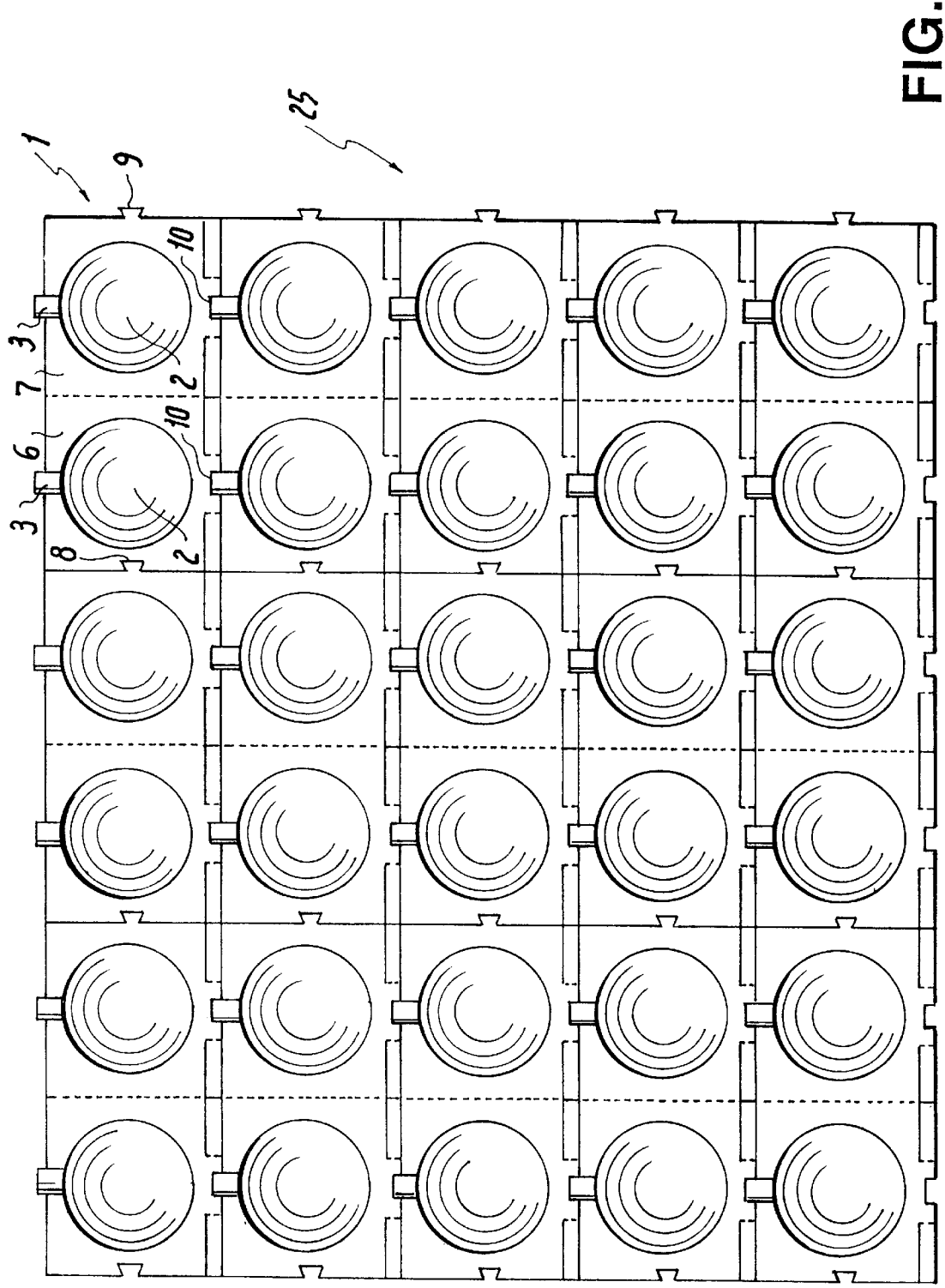
FIG. 7 is a top elevational view of a sheet of multiple bulb casings as molded, scored and perforated in the manufacture thereof; and, FIG. 8 is an isometric view of a nested stack of bulb casing sheets as in FIG. 7.

FIG. 7 shows a sheet of multiple bulb casings 1, such as, for example, fifteen bulb casings 1 prior to being individually separated for single uses with single plant bulbs. Three are shown in each row. The top right bulb casing 1 is detailed, and there are five rows depicted. This is not to indicate that this is a process limitation; indeed larger sheets are feasible. The fold lines are scored and the interfaces between adjacent bulb casings 1 are perforated for easy detachment.

Notch 10 of bulb casing 1 is formed from the removal of neck 3 of an adjacent bulb casing 1 from the next row. The particular type of molding process must be compatible with the material used. Injection molding, press molding, pressure molding and vacuum molding are all possible with the various trade-offs of material cost, labor content, tooling costs and production volume.

Figure 8:
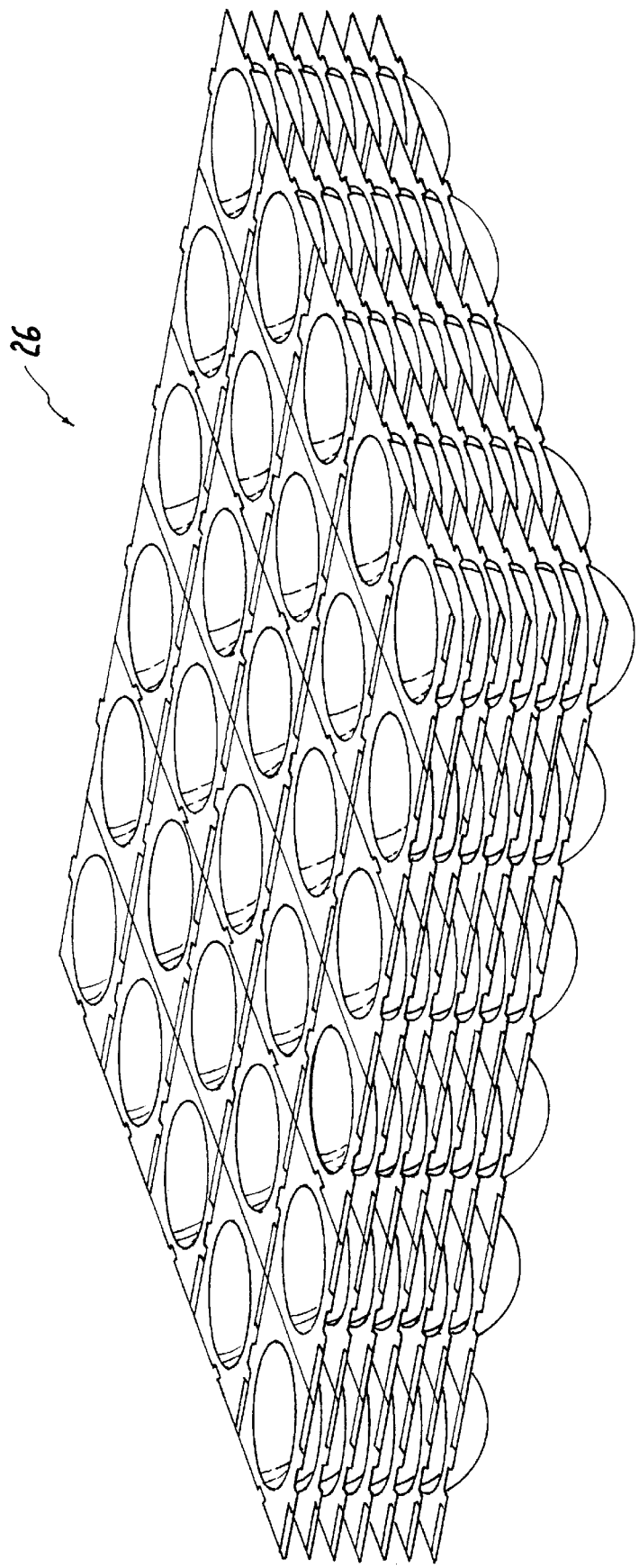

FIG. 8 shows a stack of multiple sheets, such as seven sheets of fifteen bulb casings 1, for a total of 105 bulb casings. This is a very compact array that takes up little shelf space at a retail horticultural store.

While the drawing FIGS. 1–8 show that hemispheric cavity members 2 are formed within flat half pieces 6 and 7, it is understood that other embodiments may be made, such as having two hemispheric members directly joined at a common hinge thereto. (not shown in the drawings)

In addition, it is also possible that the two half pieces with the cavity members, or two hemispheric members, can be, separate joinable pieces, which are joined by snaps or latches. (not shown in the drawings)

It is further noted that other modifications may be made to the present invention, without departing from the scope of the invention, as noted in the appended Claims.

I claim:

1. A bulb casing for properly positioning, feeding and protecting a single plant bulb therein, comprising a hollow biodegradable casing including two joinable, substantially hemispheric cavity members for insertion and encasing of the plant bulb therein, said hemispheric cavity members of each said bulb casing each having an outer convex surface and an inner concave surface, wherein said bulb casing includes at least one plant nutritional supplement being provided on an inside concave surface adjacent to the bulb's outer surface.

2. The bulb casing as in claim 1 wherein said at least one plant nutritional supplement comprises bone meal.

3. The bulb casing as in claim 1 wherein said hemispheric cavity members are formed out of biodegradable molded paper pulp.

4. The bulb casing as in claim 1 wherein said hemispheric cavity members are formed out of a biodegradable, moldable starch-based resin.

5. The bulb casing as in claim 1 wherein said two hemispheric cavity members are each provided on a flat piece of biodegradable material, which said flat piece of biodegradable material is scored at a mid point thereof, to form a hinge, wherein said two hemispheric cavity members converge to form a spherical casing around the plant bulb inserted therein.

6. The bulb casing as in claim 5 further comprising a latch to close said bulb casing around the plant bulb.

7. The bulb casing as in claim 6 wherein said latch comprises a loose joint with a tab and recess formed therein to close said bulb casing around the plant bulb.

8. The bulb casing as in claim 5 wherein on a bottom portion of said flat pieces are provided extendible leg portions, wherein upon extension thereof, said bulb casing is self standing in an upright position within the planting hole in which the bulb is to be planted.

9. The bulb casing as in claim 8 wherein said hemispheric cavity members are folded and latched with stand members ready to engage the soil at the bottom of the planting hole to maintain said bulb casing in an upright position.

10. The bulb casing as in claim 5 wherein said hemispherical cavity members communicate with an open neck therebetween.

11. The bulb casing as in claim 5 wherein said bulb casing includes at least one plant nutritional supplement which has been adhered to said respective concave inside surfaces of said hemispherical cavity members.

12. The bulb casing as in claim 5 wherein said at least one plant nutritional supplement is impregnated within said biodegradable material of said bulb casing.

13. The bulb casing as in claim 5 wherein said bulb casing is provided detachable from a matrix of a plurality of bulb casings, wherein fold lines therebetween are scored and interfaces between adjacent bulb casings are perforated for easy detachment, wherein said notch of each said bulb casing is formed from the removal of a neck of an adjacent bulb casing from an adjacent next row of said bulb casings.

14. A bulb casing for properly positioning, feeding and protecting a single plant bulb therein, comprising a hollow biodegradable casing including two joinable, substantially hemispheric cavity members for insertion and encasing of the plant bulb therein, said hemispheric cavity members of each said bulb casing each having an outer convex surface and an inner concave surface, wherein said bulb casing includes at least one rodent repellent material on said outside surface thereof.

15. The bulb casing as in claim 14 wherein said rodent repellent material comprises camphor.

16. The bulb casing as in claim 14 wherein said rodent repellent comprises naphthalene.

17. The bulb casing as in claim 14 wherein said rodent repellent is cayenne pepper.

18. The bulb casing as in claim 14 wherein said hemispheric cavity members are formed out of a biodegradeable molded paper pulp.

19. The bulb casing as in claim 14 wherein said hemispheric cavity members are formed out of a biodegradeable, moldable starch-based resin.

20. The bulb casing as in claim 14 wherein said two hemispheric cavity members are each provided on a flat piece of biodegradable material, which said flat piece of biodegradable material is scored at a mid point thereof, to form a hinge, wherein said two hemispheric cavity members converge to form a spherical casing around the plant bulb inserted therein.

21. The bulb casing as in claim 20 wherein said bulb casing includes at least one rodent repellent which has been adhered to said respective concave inside surfaces of said hemispherical cavity members.

22. The bulb casing as in claim 20 wherein said at least one rodent repellent is impregnated within said biodegradable material of said bulb casing.

23. The bulb casing as in claim 20 further comprising a latch to close said bulb casing around the plant bulb.

24. The bulb casing as in claim 23 wherein said latch comprises a loose joint with a tab and recess formed therein to close said bulb casing around the plant bulb.

25. The bulb casing as in claim 20 wherein on a bottom portion of said flat pieces are provided extendible leg portions, wherein upon extension thereof, said bulb casing is self standing in an upright position within the planting hole in which the bulb is to be planted.

26. The bulb casing as in claim 25 wherein said hemispheric cavity members are folded and latched with stand members ready to engage the soil at the bottom of the planting hole to maintain said bulb casing in an upright position.

27. The bulb casing as in claim 20 wherein said hemispherical cavity members communicate with an open neck therebetween.

28. The bulb casing as in claim 20 wherein said bulb casing is provided detachable from a matrix of a plurality of bulb casings, wherein fold lines therebetween are scored and interfaces between adjacent bulb casings are perforated for easy detachment, wherein said notch of each said bulb casing is formed from the removal of a neck of an adjacent bulb casing from an adjacent next row of said bulb casings.

29. A bulb casing for properly positioning, feeding and protecting a single plant bulb therein, comprising a hollow biodegradable casing including two joinable, substantially hemispheric cavity members for insertion and encasing of the plant bulb therein, said hemispheric cavity members of each said bulb casing each having an outer convex surface and an inner concave surface, wherein said bulb casing includes at least one plant nutritional supplement being provided on an inside concave surface adjacent to the bulb's outer surface, wherein further said bulb casing includes at least one rodent repellent material on said outer surface.

* * * * *